United States Patent
Schiavi (10) Patent No.: US 7,460,214 B2
(45) Date of Patent: Dec. 2, 2008

(54) SURFACE METERING DEVICE

(75) Inventor: Jean-Pierre Schiavi, Sainte Foy d'Aigrefeuille (FR)

(73) Assignee: Measurix, Sainte Foy d'Aigrefeuille (FR)

( * ) Notice: Subject to any disclaimer, the term of this patent is extended or adjusted under 35 U.S.C. 154(b) by 318 days.

(21) Appl. No.: 10/589,670

(22) PCT Filed: Feb. 17, 2005

(86) PCT No.: PCT/FR2005/000365

§ 371 (c)(1),
(2), (4) Date: Aug. 16, 2006

(87) PCT Pub. No.: WO2005/090910

PCT Pub. Date: Sep. 29, 2005

(65) Prior Publication Data

US 2008/0151216 A1    Jun. 26, 2008

(30) Foreign Application Priority Data

Feb. 19, 2004  (FR) .................................. 04 01661
Mar. 12, 2004  (FR) .................................. 04 02603

(51) Int. Cl.
*G01C 3/00* (2006.01)

(52) U.S. Cl. ................................... 356/3.01
(58) Field of Classification Search ....... 356/3.01–3.15, 356/4.01–4.1, 5.01–5.15, 6–22
See application file for complete search history.

(56) References Cited

U.S. PATENT DOCUMENTS 4,025,192 A * 5/1977 Scholdstrom et al. ...... 356/4.01

5,337,149 A * 8/1994 Kozah et al. ................ 356/601
6,349,249 B1 * 2/2002 Cunningham ................ 701/28
2005/0195384 A1 * 9/2005 Ohtomo et al. ............ 356/4.05

FOREIGN PATENT DOCUMENTS

DE   195 45 589   6/1997
FR   2 630 539   10/1989

OTHER PUBLICATIONS

Patent Abstracts of Japan vol. 2003, No. 2, Dec. 5, 2003 & JP 2003 329453 A (Kyokuto Sanki Co Ltd), Nov. 19, 2003.

* cited by examiner

*Primary Examiner*—Thomas H Tarcza
*Assistant Examiner*—Luke D Ratcliffe
(74) *Attorney, Agent, or Firm*—Young & Thompson (57) ABSTRACT

A method for measuring the area of polygonal planar surfaces in space, wherein a device is used having a range finder mounted on a leg support by a frame having a central point, elements for the angular tracking in space of the viewing direction of the range finder, elements for triggering the acquisition of the spherical coordinates of the point targeted by the range finder, and a digital processing unit. For each polygonal planar surface to be measured, a series of measuring points is plotted which allows the surface to be determined topologically and individually and which includes, for each surface edge, at most two points, whose projections on the surface in a predetermined direction pertain to the edge. The processing unit produces a digital model of the surface by generating segments from the spherical coordinates of the measuring points plotted and for calculating the surface area of the digital model.

36 Claims, 4 Drawing Sheets

SURFACE METERING DEVICE

The invention relates to a device and a method for measuring the area of polygonal planar surfaces in space. It concerns, more specifically, the field of building (architecture, construction, etc.) and seeks to provide a tool for measuring surfaces and, in particular, for calculating the area of the floor, the ceiling and the walls of a room.

The traditional method, used for measuring and calculating the area of the surfaces delimiting a room, consists in:
- calculating, for each rectangular planar surface, such as a section of wall, or else the floor or the ceiling of the room if said room is rectangular, the area of this surface based on a measurement of its length and its width,
- defining, for each polygonal planar surface of more complex geometry, a division of this surface into triangles (triangulation method) by "tracing" diagonal lines connecting a given peak of the polygonal surface to each of the other peaks and calculating the area of the surface from the measurements of each of these diagonals and each side of the surface.

The measurements (width, length, diagonal line, etc.) are generally taken using a tape measure or a range finder then noted by the measurer on a paper outline; the calculations are made by manually inputting the measured dimensions into a calculating tool such as a spreadsheet or a computer. This method requires the operator to move numerous times to carry out the measurements, careful attention to determine the dimensions to be measured and the calculation rules to be applied, and numerous manual operations which require a high degree of precision (in particular when reading the range finder and noting the dimensions measured on the outline, and when inputting said dimensions into the calculation tool). There is considerable scope for error. This method also presupposes that the measurements may be taken unimpeded (that there are no items of furniture in the way, etc.).

Some known devices allow architectural surveys (graphical representations of an existing structure) to be carried out semi-automatically, which architectural surveys may then be used for calculating areas, with the aid of an independent spreadsheet or a spreadsheet integrated into the surveying device. The known surveying devices allow limitation of, on the one hand, the likelihood of error (which is basically limited to the choice of the points plotted using the device) and, on the other hand, the movements of the measurer (the readings being taken from a central station—or optionally from a plurality of central stations).

DE 195 45 589 describes a device and a method allowing such architectural surveys to be carried out, with the sole aim of marking, on the existing building, lines, surfaces or volumes indicating the future position of a construction element to be installed, such as a suspended ceiling, a partition, etc. The marking method of DE 195 45 589 consists in:
- reconstructing an "idealised" mathematical model of "the real space" observed, from the spherical coordinates of measuring points plotted by a range finder and angle encoders; if the real space observed is a planar surface, three measuring points should be plotted on this surface in order to generate a plane in the mathematical model; in order to delimit the contour of this surface, the adjacent surfaces must also be plotted; similarly, if the real space observed is a volume, three points should be plotted on each of the surfaces delimiting said volume,
- targeting a point, known as the reference frame point, and correcting the view (i.e. the orientation of the range finder) in such a way that the reference frame point corresponds to a setpoint identified in the mathematical model and located on the line, surface or volume to be marked; then physically marking the reference frame point on the existing frame.

In order to do this, the range finder and the angle encoders are associated with a computer processing unit integrating, on the one hand, a program for producing the idealised mathematical model of the real space observed and, on the other hand, a program for correcting discrepancies between the real position of the reference frame point targeted by the range finder and the set position, which correction program is capable of automatically orienting the range finder.

It should be noted that the computer unit does not have any area-calculating program and that DE 195 45 589 does not in any way suggest using the mathematical model produced for calculating areas of planar surfaces.

FR 2 630 539 describes a device combining a range finder, a theodolite and a computer processing unit, for the production of architectural surveys. The processing unit integrates a computer program allowing the production of a graphical representation of the enclosure of a room from the spherical coordinates of three (non-aligned) points plotted, from a central station, on each of the planar surfaces (floor, walls and ceiling) forming said enclosure. For each planar surface, the program firstly calculates the equation of the corresponding plane from the coordinates of the three points plotted. The program then calculates the equations of the intersections of all of the planes, taken in pairs, in order to define the edges of the enclosure in question. FR 2 630 539 indicates that the architectural survey thus carried out may be used to calculate the area of the planar surfaces forming the enclosure. It should be noted that when the room is constructed in this way, there is no central station allowing each of the planar surfaces forming the enclosure to be at least partially viewed; an imaginary partition is drawn (from an item of furniture or other object having a planar surface) so as to separate the room into two parts, the architectural surveys of which are carried out, as explained above, from two stations. The graphical representations of the two parts are then combined by selecting and determining a base of reference points which is common to the two parts; the imaginary partition appearing on the overall graphical representation obtained is then erased by the user.

Thus, in order to produce a computer model of a polygonal planar surface, both FR 2 630 539 and DE 195 45 589 teach the plotting of three points on said surface and three points on each of the surfaces delimiting said surface. In other words and by way of example, in order to model the floor of a room with a view to calculating its area (which generally corresponds to the floor area of the room), it is necessary to plot said floor and all of the walls of the room. More generally, if the polygonal planar surface to be measured has N sides, the user must plot 3(N+1) measuring points in order to model the surface.

The inventor noted that, in practice, the known devices are basically used for carrying out complete architectural surveys in order to provide plans (sections, elevations, perspectives, etc.) defining the building; they are only used for calculating area if an entire building, i.e. the floors, walls and ceilings of each room of the building, are to be measured. It has been found that the previous surface-plotting methods are too tedious to justify the use thereof merely for measuring, in a selective manner, the area of an arbitrary given surface of a building. There is to date no method or device allowing the area of a building surface, such as the floor, a wall or the ceiling of a room, to be assessed easily, quickly and in an isolated manner.

The inventor established that it might be useful to have a tool allowing the area of surfaces to be measured or assessed more easily and more quickly, both for intensive and for selective use of the tool.

The invention aims to meet this newly identified requirement by providing a method and an inexpensive device allowing the area of surfaces to be assessed extremely easily and quickly. Specifically, the invention aims to provide a simple and quick device and method for measuring the area of polygonal planar surfaces and, in particular, of polygonal planar building surfaces.

A further objective of the invention is to provide a method and a device, the carrying out or use of which does not require any specific knowledge or high degree of attention on the part of the user and is therefore within the grasp of a person of normal abilities and average attentiveness. The invention seeks to allow polygonal planar surfaces to be plotted systematically, automatically and without scope for error.

A further objective of the invention is to provide a device and a method allowing assessment of the area of an arbitrary real surface with a degree of error of less than 5% and allowing, in particular, measurement of the area of a polygonal planar surface with a degree of error of less than 1%.

The invention seeks to achieve all of these objectives without forgoing the advantages of the known previous devices and, in particular, without forgoing the possibility of measuring the area of all of the surfaces defining the enclosure of a room, even if this room is fitted out or furnished.

In order to do this, the invention relates to a method for measuring the area of polygonal planar surfaces in space, wherein
a device is used comprising:
    a range finder mounted on a leg support by means of a frame having a central point and being suitable for allowing a user to orient the range finder toward a material point of a surface, known as the targeted point, of his choice, said range finder being suitable for being able to deliver a signal representing the distance separating the central point from the targeted point,
    means for the angular tracking in space of the direction, known as the viewing direction, passing through the central point and the targeted point, these angular tracking means being suitable for being able to deliver signals representing the orientation of the viewing direction relative to a spatial reference frame centred on the central point,
    the range finder and the angular tracking means thus being suitable for being able to deliver signals representing the spherical coordinates of the targeted point relative to said spatial reference frame,
    means for triggering, at the user's command, the acquisition of the spherical coordinates of the targeted point, which means are capable of triggering the storing of digital data representing these spherical coordinates from the signals delivered by the range finder and the angular tracking means,
    a digital processing unit, suitable for being able to model polygonal planar surfaces from the acquired spherical coordinates of targeted points, known as measuring points, which allow said polygonal planar surfaces to be determined topologically.

The method according to the invention is characterised in that, for each polygonal planar surface to be measured:
    a series of measuring points is selected allowing said polygonal planar surface to be determined topologically and individually, said series comprising, for each edge of the polygonal planar surface, at most two points, the projections of which on said surface in a predetermined direction pertain to said edge,
    said surface is subjected to a modelling process in which the measuring points of the series are plotted by orienting the range finder successively toward each measuring point and by triggering the acquisition of its spherical coordinates, the processing unit being suitable for being able to:
        produce and store a geometric digital model of the polygonal planar surface by generating a segment or a straight line for each edge of said surface from the acquired spherical coordinates of at most two measuring points,
        calculate and record a value representing the surface area of the digital model thus produced.

The invention also relates to a device allowing such a method to be carried out and, in particular, to a device for measuring the area of polygonal planar surfaces in space, comprising:
    a range finder mounted on a leg support by means of a frame having a central point and being suitable for allowing a user to orient the range finder toward a material point of a surface, known as the targeted point, of his choice, said range finder being suitable for being able to deliver a signal representing the distance separating the central point from the targeted point,
    means for the angular tracking in space of the direction, known as the viewing direction, passing through the central point and the targeted point, these angular tracking means being suitable for being able to deliver signals representing the orientation of the viewing direction relative to a spatial reference frame centred on the central point,
    the range finder and the angular tracking means thus being suitable for being able to deliver signals representing the spherical coordinates of the targeted point relative to said spatial reference frame,
    means for triggering, at the user's command, the acquisition of the spherical coordinates of the targeted point, which means are capable of triggering the storing of digital data representing these spherical coordinates from the signals delivered by the range finder and the angular tracking means,
    a digital processing unit, suitable for being able to model polygonal planar surfaces from the acquired spherical coordinates of targeted points, known as measuring points, which allow said polygonal planar surfaces to be determined topologically,
    the device according to the invention being characterised in that the processing unit is suitable for being able to:
        produce and store a geometric digital model of each polygonal planar surface from a series of measuring points which allows said surface to be determined topologically and individually and comprises, for each edge of the polygonal planar surface, at most two points, the projections of which on said surface in a predetermined direction pertain to said edge, by generating a segment or a straight line for each edge of the polygonal planar surface from the acquired spherical coordinates of at most two measuring points of the series,
        calculate and record a value representing the surface area of each digital model thus produced.

The invention therefore consists in generating, in a digital model, not planes as taught by FR 2 630 539 and DE 195 45 589, but segments or straight lines corresponding to polygonal planar surface edges. Thus, in order to model a polygonal planar surface having N edges (or sides), it is sufficient, according to the invention, to plot at most two N measuring points. Each planar surface is modelled individually, independently of the surfaces delimiting it. Specifically, in order to model the floor of a room, it is not necessary to plot all of the walls delimiting this floor; it is sufficient to plot at most two points for each edge of the floor.

In addition, the processing unit according to the invention is suitable for being able to generate a segment or a straight line corresponding to an edge of a polygonal planar surface, not only from two measuring points targeted on this edge, but also from two measuring points, the projections of which on the edge in a predetermined direction pertain to the edge, i.e. from two arbitrary points targeted on a planar surface containing the edge and the direction of projection. Specifically, in order to model the floor of a room, it is for example sufficient to plot, for each edge, at most two measuring points located on the wall overhanging said edge. This characteristic simplifies and greatly shortens the modelling processes.

The method according to the invention is particularly simple and quick. It also allows an arbitrary polygonal planar surface of a room to be measured, in a selective and isolated manner, without having to model all of the enclosure of this room.

It should be noted that the method and device according to the invention, thus defined, allow polygonal planar surfaces to be measured. However, they also allow the area of an arbitrary building surface to be assessed with a relatively high degree of precision. Indeed, one of the basic ideas which determined the design of the invention is, on the one hand, that a building consists mainly of polygonal planar surfaces and, on the other hand, that the assimilation, by a conventional discretisation method, of an arbitrary (in particular non-planar and/or non-polygonal) surface to one or more suitably chosen polygonal planar surfaces can provide an accurate estimate of the area of said surface. Thus, a planar real surface having a rounded edge may be modelled by a polygonal digital model, the perimeter portion of which, corresponding to the rounded edge of the real surface, is a broken line (the successive peaks of which correspond to targeted points on the rounded edge). Furthermore, a curved (non-planar) real surface may be modelled by a polyhedral digital model formed by a plurality of planar polygons, most of the edges of which correspond to lines of the curved real surface.

The inventor also noted that with a low degree of disretisation, i.e. by modelling an arbitrary real surface with a limited number of (for example, between one and five) simple polygons (for example, each having less than seven peaks), the area of the real surface is approached with a degree of error of less than 5%, which is the maximum degree of error permitted by the Carrez Law in the calculation of floor areas. The inventor therefore firstly demonstrated that it was possible to assess with a relatively high degree of precision the area of building surfaces using a measuring device having polygonal planar surfaces.

The angular tracking means according to the invention preferably comprise two angle encoders, each measuring the angle formed by the viewing direction and a reference plane of the spatial reference frame.

In order to allow the user to orient the range finder toward a targeted point of his choice, the frame comprises, for example, means for maneuvering the range finder which are suitable for allowing said range finder to be oriented manually by the user. The frame advantageously consists of two gimbals, a first gimbal mounted on the leg support so as to pivot freely about a vertical axis of rotation and a second gimbal mounted on the first gimbal so as to pivot freely about a horizontal axis of rotation, the range finder being fixed to this second gimbal. The range finder may thus be manually oriented toward each measuring point.

This preferred version of the invention does not rule out the possibility of providing the frame with means for maneuvering the range finder, which means are suitable for allowing automatic and programmed orientation of said range finder, such as motors for driving the above-described gimbals in rotation. However, it has been found that such means unnecessarily increase the cost of the device and complicate use thereof.

Advantageously and according to the invention, the acquisition of the spherical coordinates of each measuring point is manually triggered at the viewing moment of said measuring point. In order to do this, the triggering means comprise a manual triggering member having immediate effect. The triggering member is, for example, a mechanical member or a thermal, or optionally optical, sensitivity member capable of detecting the presence of the user's finger, etc. In a preferred version, the device integrates a conventional known range finder and the triggering member according to the invention corresponds to the storing button of the range finder, modified in such a way that depressing said button triggers not only storing of the distance measured by the range finder but also that of the angles measured by the angular tracking means. However, this version of the invention does not rule out the possibility of providing the device with programmable triggering means having a delayed effect.

As explained above, in order to produce the digital model of a polygonal planar surface, a series of measuring points is selected allowing said surface to be determined topologically. In particular, a series of measuring points, known as a complete series, is selected which determines on its own the topology of the polygonal planar surface. The processing unit according to the invention is suitable for producing a digital model of a polygonal planar surface from the acquired spherical coordinates of a complete series of measuring points of this type.

In particular, advantageously and according to the invention, the processing unit according to the invention is suitable for creating a digital model of a polygonal planar surface from a series of measuring points comprising, for each peak of the polygonal planar surface, a point, the projection of which on said surface in a predetermined direction coincides with said peak. In the method according to the invention, a series of measuring points of this type is selected for at least one polygonal planar surface. The digital model is, in this case, constructed from points modelling the peaks of the polygonal planar surface, which points define segments corresponding to the edges of the polygonal planar surface. Each end of a segment (peak of the digital model) is generated from the spherical coordinates of a measuring point located on an axis which passes through the corresponding peak of the polygonal planar surface and is parallel to a predetermined direction of projection (which is the same for all of the peaks). This measuring point may be the peak itself. A series of such measuring points determines entirely, on its own, the topology of said surface; this is a complete series.

For example, in order to measure a horizontal polygonal planar surface of a room, such as a horizontal floor or ceiling, there is advantageously selected a (complete) series of measuring points comprising, for each peak of the polygonal surface, a point, the projection of which in the vertical direction (this is an orthogonal projection) on said horizontal surface coincides with said peak. Thus, if the device is intended to be used for measuring the area of surfaces delimiting a room, the processing unit is advantageously suitable for providing a digital model of a horizontal polygonal planar surface, such as a horizontal floor or ceiling, from a series of measuring points comprising, for each peak of the polygonal surface, a point, the vertical projection of which on said horizontal surface coincides with said peak. This point may be the peak itself or a point located on a vertical axis passing through this peak, i.e. located in the corner of the room at the intersection of the two vertical walls surrounding said peak. This point may therefore be selected at an arbitrary height in the corner of the room, thus avoiding the problem caused by any obstructing furniture.

Advantageously and according to the invention, in variation or-preferably-in combination, the processing unit according to the invention is also suitable for producing a digital model of a polygonal planar surface from a series of measuring points comprising, for each peak of the polygonal planar surface, two points, the projections of which on the surface in a predetermined direction pertain to said peak and are separate; in the method according to the invention, a series of measuring points of this type is selected for at least one polygonal planar surface. The digital model is, in this case, constructed from straight lines modelling the peaks of the polygonal planar surface. Each straight line of the model is generated from the spherical coordinates of two measuring points located in a plane defined by the corresponding edge of the surface and by a predetermined direction of projection (the same for all of the edges). One (or more) of these points may be located on the edge itself; it may even correspond to an end of the edge, i.e. to a peak of the polygonal surface. A series of points of this type determines entirely, on its own, the topology of said surface; this is a complete series.

For example, in order to measure a horizontal polygonal planar surface of a room, such as a horizontal floor or ceiling, there is selected a (complete) series of measuring points comprising, for each edge of the polygonal surface, two points, the projections of which in the vertical direction (orthogonal projection) on said horizontal surface pertain to said edge and are separate. Thus, if the device is intended to be used for measuring the areas of surfaces delimiting a room, the processing unit is advantageously suitable for producing a digital model of a horizontal polygonal planar surface, such as a horizontal floor or ceiling, from a series of measuring points comprising, for each edge of the polygonal surface, two points, the vertical projections of which on said horizontal surface pertain to said edge and are separate. In other words, the points are located on the edge itself or on the vertical of said edge, on the vertical wall delimited by the edge. In this case, too, the invention obviates the problem of obstructing furniture, since it is possible to select two arbitrary points on the vertical wall delimited by said edge, as these two points are not aligned in the vertical direction (and accordingly have separate projections).

It should be noted that although this version of the method according to the invention leads to the plotting of up to twice as many measuring points as the preceding version, in which points corresponding to the peaks of the surface are plotted, each reading is taken more quickly, since the user does not have precisely to target a peak (or a vertical corner of the room if the surface to be measured is horizontal), but may select an arbitrary point on the edge (or on the vertical wall which overhangs it).

Advantageously and according to the invention, the process of modelling each polygonal planar surface preferably includes an initial input of an order to start said process and a final input of an order to terminate said process, with the aid of a user interface of the device.

If the processing unit is suitable for producing digital models from various types of series of measuring points, such as series of peaks, series of edge points, possibly series comprising edge points and peaks, etc., a type of series of measuring points is selected, for modelling a polygonal planar surface, and an item of data defining the type of series selected is input at the start of the modelling process (before plotting a first measuring point).

The order to start a modelling process and the item of data defining the type of series of measuring points selected for the process may be input concomitantly by means of a single command from the user interface. This command may also allow definition of the type of surface to be measured: horizontal surface, vertical surface, inclined surface, arbitrary surface, etc. The processing unit is, for example, suitable for allowing the user to input:

an order to start a process of modelling an arbitrary polygonal planar surface from measuring points corresponding to the peaks of the surface, by means of a first command, an order to start a process of modelling an arbitrary polygonal planar surface from measuring points corresponding to edge points of the surface, by means of a second command, an order to start a process of modelling a horizontal-or respectively vertical-polygonal planar surface from measuring points corresponding to the peaks of the surface, by means of a third—or respectively fourt—command, an order to start a process of modelling a horizontal-or respectively vertical-polygonal planar surface from measuring points corresponding to edge points of the surface, by means of a fifth—or respectively sixth—command, etc.

In numerous cases, the geometry (or topology) of the polygonal planar surface is such that it is possible to determine a positioning point of the device, known as the observation point, from which all of the measuring points are visible. The measuring points are then all plotted from this observation point.

If this is not the case, the process of modelling the polygonal planar surface includes the following steps:

measuring points of the corresponding series, which are visible from a first observation point, are plotted, the central point of the device is moved to a second observation position from which at least one other measuring point from said series, which is not visible from the first observation point, is visible, points, known as resetting points, are plotted from the second observation point, said resetting points being selected so as to allow the position of the second observation point to be plotted relative to the first observation point, the measuring point(s) which is/are visible from the second observation point are plotted, the processing unit being suitable for calculating the coordinates, in the spatial reference frame of the first observation point, of the second observation point and of the measuring point(s) plotted therefrom.

It should be noted that the first observation point is selected so as to be able to plot from this point a maximum number of measuring points of the series.

Said first observation point is also preferably selected in such a way that there is visible therefrom at least a number of measuring points sufficient to allow modelling of at least one edge of the polygonal surface, which is also visible from a second observation point: two points corresponding to two ends (peaks) of this edge (actual ends or points, the projections of which on the surface in a predetermined direction coincide with these ends) are then selected as resetting points for the second observation point. The first observation point may also be selected in such a way that there is visible, from the two observation points, at least a number of measuring points sufficient to allow modelling of at least two non-parallel edge lines of said surface, the terms "edge line" designating the (infinite) straight line carrying the edge (finite segment): two points corresponding to two arbitrary points on each of these two edges (i.e. four points in total) are then selected as resetting points for the second observation point. In the two cases, the resetting points are points targeted on the polygonal planar surface to be measured or on a surface delimiting said polygonal planar surface, and not points targeted on a reflective target installed by the user. The resetting is therefore precise. Furthermore, unlike in FR 2 630 539, no "imaginary partition" is defined, and this reduces the scope for error (in the method of FR 2 630 539, there is a risk that it may be forgotten to remove this partition from the model, etc.).

It should also be noted that it may be necessary to move the device (i.e. its central point) to a third observation point, if there are still measuring points to be plotted (points which are not visible from the two first observation points), and to continue to do so until all of the measuring points of the series have been plotted. The position of each additional observation point must be identified in the spatial reference frame of the first observation point, by plotting suitably selected resetting points.

As defined initially, the processing unit is suitable for producing a digital model from the acquired spherical coordinates of a series of measuring points which allows the polygonal planar surface to be determined topologically and, in particular, from a complete series of measuring points which on its own determines this topology.

In combination, advantageously and according to the invention, the processing unit is also suitable for:
    allowing the user, by means of a graphic user interface, to input data, known as constraint data, allowing definition of geometric constraints to be imposed on a digital model, including data allowing generation of geometric objects in the digital model and data allowing generation of geometric relationships between geometric objects of the digital model,
    managing constraint data input so as to allow the production of a digital model of a polygonal planar surface by generating segments and/or straight lines from the acquired spherical coordinates of a series of measuring points, known as a reduced series, and constraint data input from a series of geometric constraints, said series of measuring points and constraints allowing, in combination, the topology of the polygonal planar surface to be determined. In other words, the measuring points and the geometric constraints are selected in such a way that, in combination, they determine (entirely) the topology of the polygonal planar surface, the reduced series of measuring points determining, on its own, this topology only partially.

The invention therefore also extends to a measuring method wherein, for at least one polygonal planar surface to be measured:
    on the one hand, a series of measuring points, known as a reduced series, and, on the other hand, a series of geometric constraints to be imposed on a digital model of the polygonal planar surface, including at least one geometric object to be imposed on said digital model and/or at least one geometric relationship to be imposed between geometric objects of said digital model, are selected, said series of measuring points and geometric constraints being selected in such a way that, in combination, they determine the topology of the polygonal planar surface,
    said surface is subjected to a modelling process in which each measuring point of the corresponding series is plotted and data, known as constraint data, allowing each geometric constraint of the corresponding series to be defined, are input by means of a graphic user interface,
    the processing unit being suitable for:
        allowing the user to input such constraint data and to manage said data,
        producing a digital model of the polygonal planar surface by generating segments and/or straight lines from the acquired spherical coordinates of the reduced series of measuring points and from the input constraint data of the series of constraints.

The processing unit according to the invention is, for example, suitable for allowing the user to input constraint data generating geometric objects selected from a point, a segment, a polygon, etc. In the method according to the invention, at least one item of constraint data generating a geometric object of this type is input. The user interface is advantageously suitable for allowing the user to draw geometric objects (points, segments, polygons, etc.) by graphical means (graphics tablet and light pen, etc.), by predefined commands (keys on a keyboard or icons displayed on a screen and selected using a cursor, respectively commanding the generation of a given point, segment, polygon, etc.) or by descriptive command lines, etc.

Advantageously and according to the invention, the processing unit is also suitable for:
    allowing the user to input constraint data generating curved geometric objects such as an arc, and in particular an arc of a circle (in the method according to the invention, at least one item of constraint data generating a curved geometric object is input),
    producing a non-polygonal planar digital model integrating a/some curved geometric object/s, from such constraint data (and from a reduced series of measuring points),
    calculating a value representing the surface area of the digital model thus produced.

For example, the processing unit is suitable for allowing the generation of an arc of a circle or any other primitive passing through three points and, in particular, through three measuring points, etc.

In this version of the invention, the device therefore also allows measurement of non-polygonal planar surfaces and the provision of an even more precise estimate of the area of a (planar or non-planar) non-polygonal surface.

The processing unit according to the invention is also preferably suitable for allowing the user to input constraint data generating geometric relationships selected from an angle between two segments of the digital model, an orientation of a segment, a length of a segment, a junction between two segments, a parallel arrangement of two segments, etc. In the method according to the invention, at least one item of constraint data generating a geometrical relationship of this type is input. In this case, too, these data are preferably input by means of predefined commands (keys on a keypad, icons on a graphic interface, etc.).

It should be noted that the imposed geometric relationships may carry existing geometric objects, generated by measurement, of the digital model (points corresponding to measuring points, segments defined by measuring points, etc.) and/or geometric objects added to the digital model by the user via the graphic interface, i.e. generated by constraint data (constraint points or segments used to supplement the reduced series of measuring points).

The constraints to be imposed on the digital model are selected by the user on the basis of a visual assessment, which is of course an approximation: an angle in a building is never perfectly straight, an edge is never actually rectilinear, vertical or horizontal. Nevertheless, the results obtained in the calculation of surface area are accurate, errors resulting from assumptions made by the user in defining the constraints to be imposed having little effect on the calculated surface area.

The management of such constraints (objects and relationships) by the processing unit allows limitation of the number of measuring points to be plotted, by the introduction of simple constraints such as, for example, the production of a peak on the digital model and of a right angle at this peak, or else the production of a segment defined by a measuring point and an item of input constraint data imposing the orientation of the segment.

This possibility becomes particularly advantageous for specific complex polygonal planar surfaces for which there cannot be defined any observation point from which all of the measuring points from a series completely determining the topology of the surface are visible. Thus, according to the invention, there is selected a reduced series of measuring points for which there exists at least one observation point from which all of the measuring points of the series are visible, said points are plotted from this single observation point and data are input which, in combination with the measuring points, determines the topology of the surface and therefore the digital model. In particular, there is input constraint data generating, in the digital model, one or more constraint point(s) and imposing geometric relationships (angles, junctions, etc.) between the various segments or points of the model, so as to define a complete series of construction points (measuring points and constraint points) completely determining the topology of the polygonal planar surface. A method of this type obviates the need to plot measuring points from a plurality of separate observation points. It also allows fewer measuring points to be plotted, by benefiting from the notable geometric characteristics of the surface to be measured, including the case in which a complete series of measuring points may be plotted from a single observation point. The number of measures to be taken and the time devoted to the plotting of the polygonal surface are thus considerably reduced. The method according to the invention is particularly quick and effective.

However, depending on the geometry of the polygonal planar surface, it may be necessary to combine, on the one hand, measuring points plotted from a plurality of separate observation points and, on the other hand, the use of geometric constraints allowing complete determination of the topology of the polygonal planar surface (by generating, for example, constraint points which are added to the measuring points). In any case, the use of constraints reduces the number of measuring points to be plotted.

It should be noted that if geometric constraints are used, the various steps of the modelling process (plotting of a measuring point, input of an item of constraint data, etc.) are carried out in a particular order, depending on the constraints selected.

It should also be noted that if geometric constraints are used, the measuring points of the reduced series may, as in a complete series in the case of a modelling process not using constraints, be selected so as to correspond to peaks or edge points of the polygonal planar surface. There is thus selected, for example, a reduced series of measuring points comprising, for a plurality of the peaks of the polygonal surface, a point, the projection of which on said surface in a predetermined direction coincides with said peak. In a variation, there is selected a reduced series of measuring points comprising, for a plurality of the edges of the polygonal surface, two points, the projections of which on the surface in a predetermined direction pertain to said edge and are separate.

Advantageously and according to the invention (and unlike the known previous devices), the processing unit is suitable for producing two-dimensional geometric digital models. In variation or in combination, the processing unit is suitable for producing three-dimensional geometric digital models.

Furthermore, the processing unit is preferably suitable for managing non-oriented constraints, using a variational approach. A non-oriented constraint is expressed in the form of an algebraic equation. A problem is said to be variational if this problem may be broken down into a set of sub-problems which may be solved simultaneously. In a variation, the processing unit is suitable for managing oriented constraints, using a parametric approach. An oriented constraint may be expressed in the form of an explicit function. A problem is said to be parametric if this problem may be broken down into a set of sub-problems which may be solved individually, in sequence, one after the other, and in a given order.

Advantageously and according to the invention, the processing unit is suitable for calculating and recording a value representing the length of at least one, and preferably each, segment of a digital model produced, and also a value representing the length of the perimeter of the digital model, i.e. the sum of the lengths of all of the segments of said model. The device according to the invention thus allows the measurement of linears, such as the linear of walls of a room, which corresponds to the perimeter of the floor of the room, i.e. to the length of the contour of the polygonal digital model representing the floor (obtained by the sum of the lengths of its segments).

Finally, it should be noted that the digital model produced provides a plane of the polygonal planar surface, which may be displayed, printed, optionally modified, etc. A three-dimensional consolidated digital model (as will be defined hereinafter) provides, in addition to the planes of the corresponding surfaces, perspective views of the room, the building, etc. In other words (although this is not the objective of the invention), the device according to the invention, like that of FR 2 630 539, is also suitable for producing planes of existing buildings, which may then be reused by architects, contractors, etc. for monitoring a building site, carrying out modifications, designing another building, etc.

The invention also relates to a measuring device and method characterised in combination by all or some of the characteristics mentioned hereinbefore and hereinafter.

Figure 1:
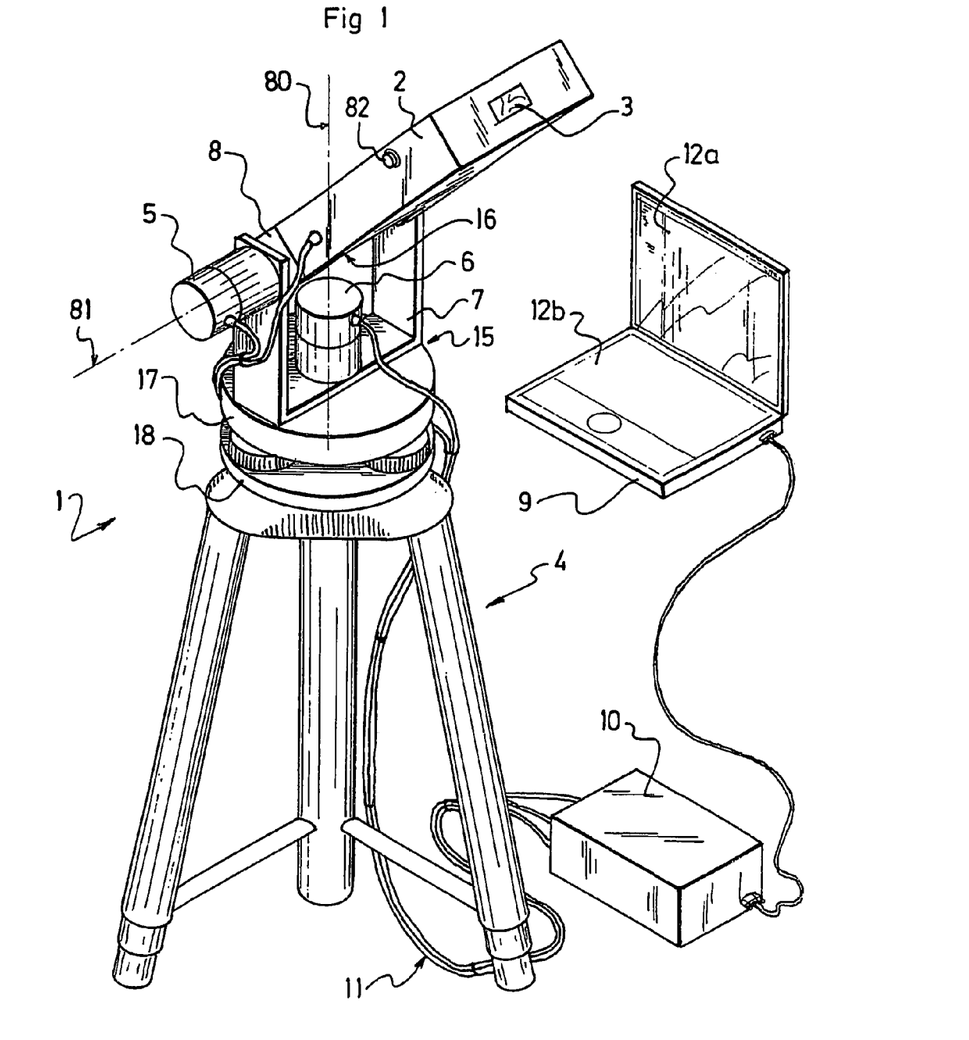
FIG. 1 is a perspective view of a device according to the invention.

Other objects, characteristics and advantages of the invention will become apparent on reading the following description, which refers to the appended figures illustrating preferential embodiments of the invention, given solely by way of non-limiting examples. In the drawings:

FIG. 1 illustrates a measuring device 1 according to the invention.

Said device comprises:

a range finder 2 having a laser 3, capable of measuring a variable representing the distance separating a reference point associated with the range finder and an arbitrary material point targeted on a surface, and of delivering a corresponding signal; the targeted point is identified by the laser of the range finder, a leg support 4 in the form of a tripod, a frame 15 for the mounting of the range finder 2 on the tripod 4, comprising a base 17 fixed to an upper plate 18 of the tripod, a first gimbal 7, the web of which is mounted on the base 17 so as to rotate about a vertical axis 80 passing through the centre of said base, a second gimbal 8 mounted, by the end of its branches, on the branches of the first gimbal 7 so as to be able to pivot about a horizontal axis 81 passing through the ends of the branches of the first gimbal; the gimbals thus form a frame having a central point 16, which (virtual) point corresponds to the intersection of the vertical and horizontal axes of rotation 80 and 81; the range finder 2 is fixed to the web of the second gimbal 8 by its rear face in such a way that its longitudinal axis intersects the vertical axis 80; the range finder is also parameterized in such a way that its reference point coincides with the central point 16 of the frame, i.e. is located behind its rear face at a distance corresponding to the distance separating said face from the horizontal axis 81, angular tracking means comprising a first angle encoder 6 suitable for measuring a variable representing the angle of rotation of the gimbal 7 about the vertical axis 80 (angle formed by the longitudinal axis of the web of the gimbal 7 and a horizontal reference axis which is fixed relative to the base 17) and for delivering a corresponding signal, and a second angle encoder 5 which is suitable for measuring a variable representing the angle of rotation of the gimbal 8 about the horizontal axis 81 (angle formed by the longitudinal axis of the range finder 2 and a horizontal reference axis which is fixed relative to the first gimbal 7) and for delivering a corresponding signal; the tracking means thus allow identification of the orientation of the viewing direction of the range finder, corresponding to its longitudinal axis, relative to a spatial reference frame centred on the central point 16 of the device; the distance measured by the range finder and the angles measured by the angle encoders form the spherical coordinates of the point targeted in the spatial reference frame; the angle encoders preferably have an accuracy of greater than (i.e. less than in terms of value) 4/10ths of a degree. Such accuracy is entirely sufficient for obtaining polygonal planar surface area calculation results with a degree of error of less than 1%, communication cables 11 allowing transmission to a digital processing unit 9 of the signals delivered by the range finder and the angle encoders; transmission takes place via an electronic preprocessing module 10, transforming the signals delivered by the range finder and the encoders into digital data signals representing the spherical coordinates of the targeted point; in a variation, the transmission cables connecting the range finder to the electronic module are replaced by means for the transmission of radiofrequency waves directly between the range finder and the processing unit, a means for triggering the acquisition of the spherical coordinates of the targeted point, formed by a key 82 (for the sake of clarity, this key is illustrated in the drawing on a lateral face of the range finder but may be arranged in a different location in the device and, in particular, on the upper face of the range finder, as is the case with the storing key of a known conventional range finder); if the user depresses this triggering key, data representing the spherical coordinates of the point targeted at the moment of depression are stored in the processing unit; in particular, depressing the key 82 results in the storing, in the processing unit 9, of an item of data representing the distance measured by the range finder 2 and the transmission, by the electronic module 10, of an order for measurement of the angles by the angle encoders 5 and 6 and for storing of the corresponding data in the processing unit; if the connection between the range finder and the processing unit is provided by radio waves, the order for measurement by the encoders is generated (on depression of the key 82) by the processing unit and transmitted to the encoders via the electronic module, a graphic user interface comprising, in particular, an input keyboard 12b and a display screen 12a allowing, in particular, display of the digital models produced by the processing unit 9; in the illustrated example, the processing unit and the user interface of the device are those of a portable personal computer. They may also be those of a digital processing device of what is known as the PDA (personal digital assistant) type, i.e. of a hand-held computer or any other portable computer device (personal organisers, mobile telephones and other terminals having a digital processing unit and a graphic interface).

Figure 2:
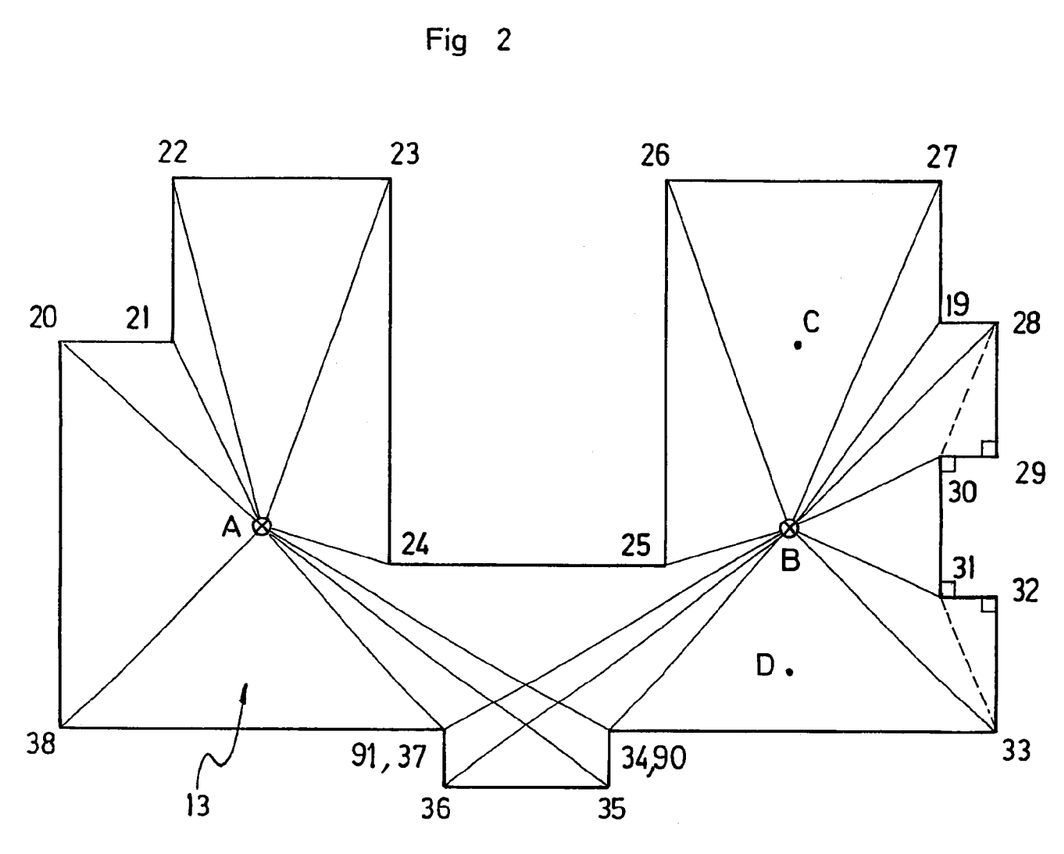
FIG. 2 is a plan, in horizontal section, of a room, the floor area of which is to be measured in accordance with the invention.

FIG. 2 illustrates the plan (horizontal section) of a room, of which the area of the floor 13, which forms a complex polygonal planar surface, is to be measured. In the illustrated example, in order to carry out this measurement, a choice was made to construct the digital model from construction points corresponding to the peaks of the polygonal planar surface.

According to the invention, of the peaks of the surface, there is selected a reduced series of peaks to be modelled from a corresponding series of measuring points and a complementary series of peaks to be modelled from a corresponding series of points, known as constraint points, generated by the introduction of constraints into the digital model during the elaboration thereof. The measuring points and the constraints are selected in such a way that they completely determine the topology of the surface to be measured and in such a way that the measuring points are plotted with a minimum number of manual operations and displacements, from a minimum number of observation points. In the illustrated example, two plotting steps from two separate observation points are required to provide a sufficient number of measuring points to allow the topology of the surface to be determined, in combination with constraints. There is thus determined a reduced series of measuring points comprising 18 points (of the 20 peaks of the surface) and a series of constraints allowing complete definition of two constraint points corresponding to the two missing peaks.

An order to start a process of modelling a horizontal polygonal planar surface from the peaks thereof is input by means of a corresponding command (selection from a starting order menu, etc.).

The device 1 is placed at a first observation point A. In order to overcome any non-flatness of the floor or non-horizontally of the base 17 (due to misadjustment of the tripod), a horizontal initialisation order is input, a point on an arbitrary surface is targeted in a horizontal viewing direction as indicated by a level carried by the range finder, and said point is plotted.

Figure 3:
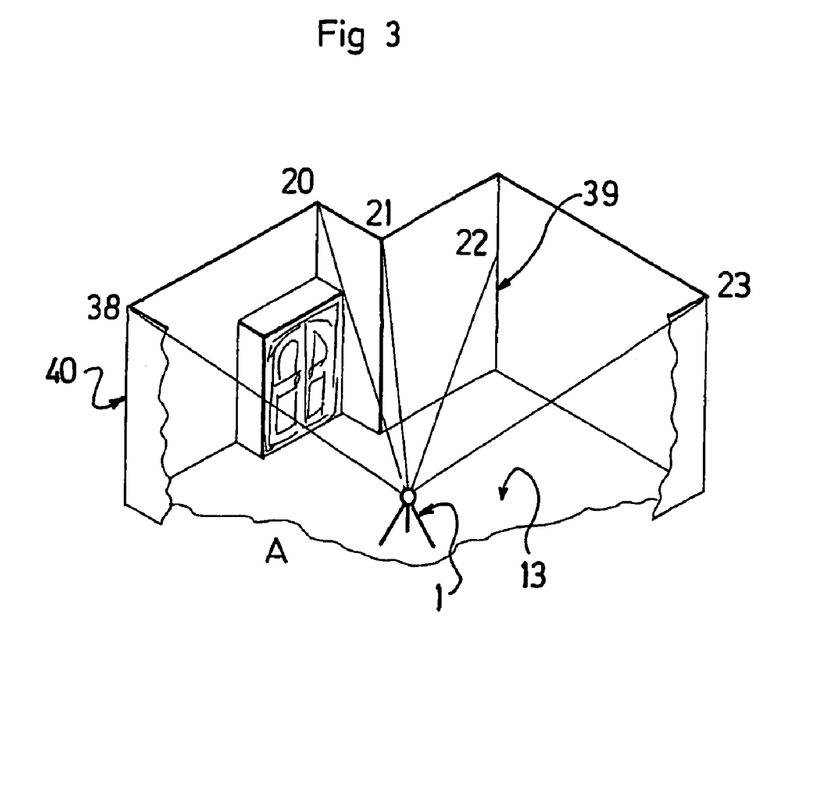
FIG. 3 is a perspective view of a portion of the room illustrated in FIG. 2.

Then, for each corner of the room visible from the first observation point A, there is plotted a measuring point located on the vertical wall edge defining said corner, i.e. a point, the vertical projection of which on the floor coincides with a peak of the polygonal planar surface forming the floor; in order to do this, the range finder is oriented toward the measuring point and the acquisition of its spherical coordinates is triggered using the button 82. The measuring points 20, 21, 22, 23, 24, 34, 35, 37 and 38 are thus plotted. Each measuring point may be selected at an arbitrary height in the corner of the room. Thus, by way of example, the measuring point 38, as illustrated in FIG. 3, is taken at the peak of the vertical wall edge 40 (at the intersection of the ceiling and the two walls forming this edge); the measuring point 22 is taken at a median height of the vertical edge 39. It is thus possible to select points for which no obstacle is interposed between the range finder and the measuring point.

The range finder is then moved to a second observation point B, from which other corners of the room (not plotted from the first point A) are visible, and the horizontal is reinitialised as explained above.

Two resetting points are plotted, each corresponding to a peak of the polygonal surface, of which a corresponding measuring point has already been plotted from the first observation point A. In order to do this, a command, known as the resetting command, is input; the peak of the digital model (if it is a two-dimensional model) or the vertical edge of the model (if it is a three-dimensional model) corresponding to the measuring point 34 is selected; there is plotted a resetting point 90 located on the wall edge on which the measuring point 34 was plotted. The process is repeated by plotting a resetting point 91 located on the wall edge on which the measuring point 37 was plotted. The processing unit is suitable for deducing therefrom the position of the observation point B relative to said wall edges and calculating the spherical coordinates of the point B in the spatial reference frame of the point A.

For each corner of the room not visible from the first observation point A and visible from the second observation point B, a measuring point located on the vertical wall edge defining said corner is plotted at an arbitrary height. The measuring points 25, 26, 27, 19, 28, 30, 31, 33 and 36 are thus plotted. Their spherical coordinates are calculated in the spatial reference frame of the observation point A.

A constraint point 29 between the model peaks generated from the measuring points 28 and 30 is added to the digital model obtained, and the presence of a right angle is imposed on the peaks of the model corresponding to the measuring point 30 and constraint point 29 (or else to the points 28 and 29, or else to the points 28 and 30, etc.), by inputting corresponding constraint data. Similarly, a constraint point 32 is produced between the peaks generated from the measuring points 31 and 33, and the presence of a right angle is imposed on the peaks corresponding to the points 31 and 32.

The processing unit is suitable for generating the segments connecting the successive construction points (peaks of the model) produced in the digital model.

Finally, an order to terminate the surface modelling process is input. The processing unit 9 then calculates the surface area of the digital model produced and delivers a resulting value to the user via the display screen 12a.

In a variation, it is possible to model all of the peaks of the polygonal planar surface solely from measuring points, i.e. from a complete series of measuring points. In this case, it is necessary to carry out three plotting steps from three observation points A, C and D, wherein a resetting step has to be performed for the two observation points C and D, by plotting from each of these points two resetting points corresponding to previously modelled peaks. Such a process is longer, and the benefit of the processing unit's capacity to manage constraints will be readily understood.

Figure 4:
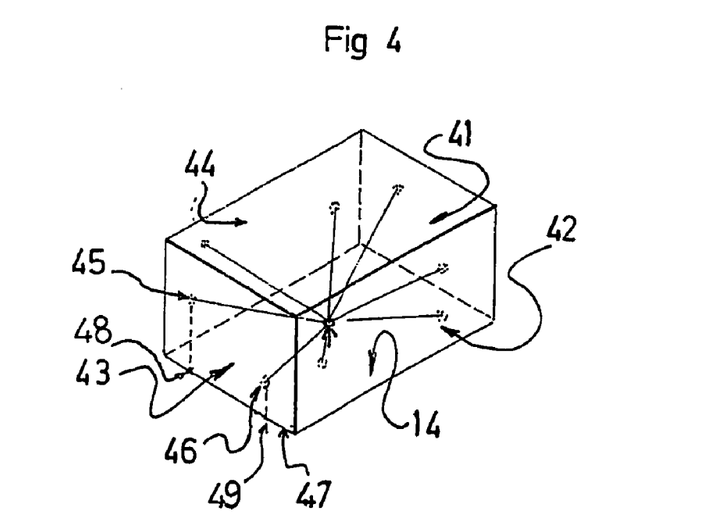
FIG. 4 is a perspective cutaway view of another room, the floor area of which is to measured in accordance with the invention.

Following the preceding example, in order to measure the floor area of a rectangular room, a modelling process may be carried out consisting in modelling all of the peaks of the rectangular floor from plotted measuring points in the corners of the room. FIG. 4 illustrates a variation of the invention for measuring such a surface.

According to the invention, the edges of the rectangular floor 14 are modelled from a complete series of measuring points comprising, for each edge, two material points, the vertical projection of which on the floor pertains to said edge. The processing unit 9 according to the invention is suitable, for each measuring point, for calculating the coordinates of a point, known as the projection point, corresponding to the projection of the measuring point on a predetermined horizontal plane, and for generating a straight line in the digital model from two projection points.

Thus, according to the invention, the device 1 is moved to an arbitrary observation point, for example a substantially central point, in the room. An order to start a process for modelling a horizontal polygonal planar surface from the edges thereof is input, and the horizontal is initialised. Two separate measuring points are then plotted on each of the four walls delimiting the room, such as the points 45 and 46 on the wall 43 (the vertical projections 48, 49 of which on the floor 14 are located on the edge 47). The points are selected at an arbitrary location on the wall (since the two measuring points of a single wall are separate and vertically non-aligned). Finally, an order to terminate the modelling process is input. The processing unit is suitable for then calculating the surface area of the digital model produced.

It should be noted that in order for the modelling to be correct, there must be plotted two successive points on a first wall 41 for example, then two successive points on any of the other walls, such as the wall 42 for example, then two successive points on another wall (43 for example), then two successive points on the last wall 44. The processing unit 9 is programmed for generating, in the model, a first straight line from the two first measuring points plotted, then a second straight line for the two following points, and so on. In the model produced, only the segments delimited by two straight-line intersections are maintained. The infinite straight-line portions extending these segments on either side are automatically eliminated.

Figure 5:
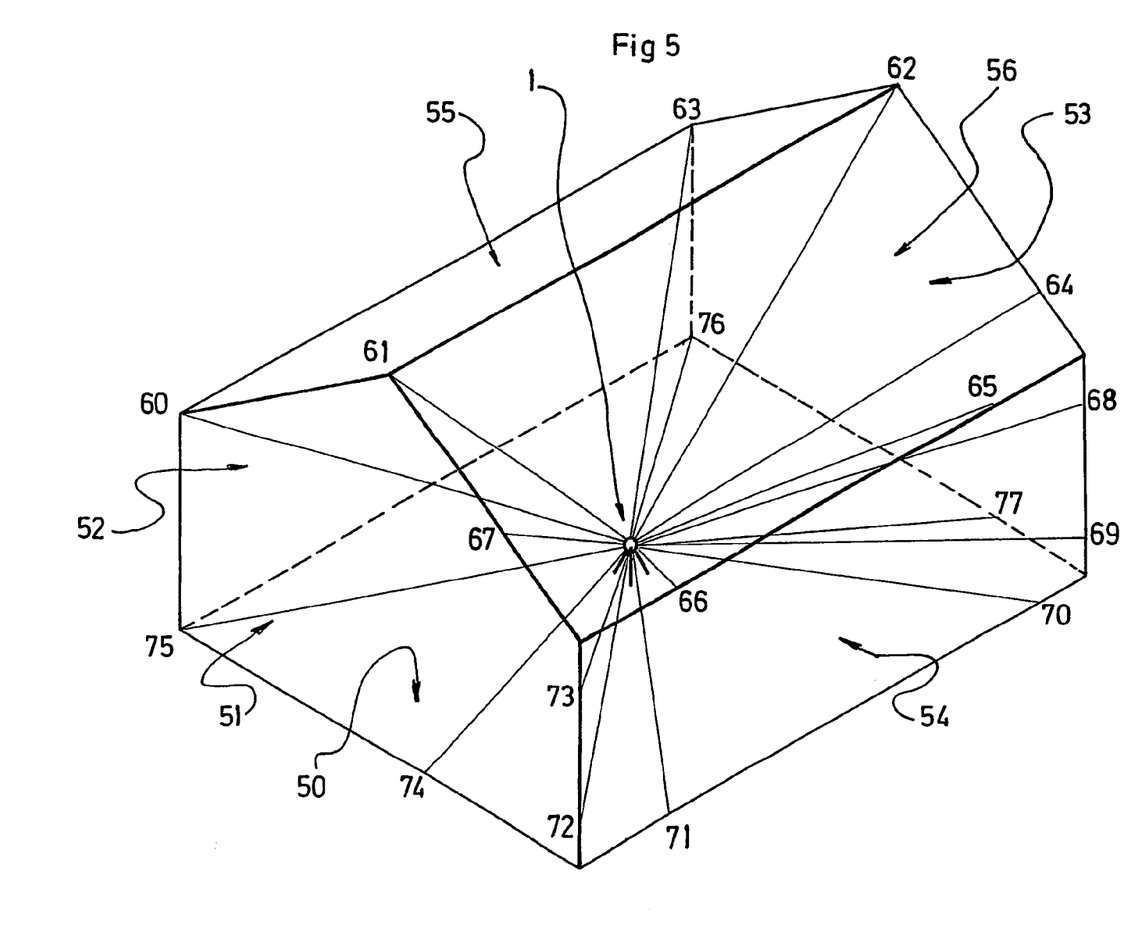
FIG. 5 is a perspective cutaway view of another room, the wall and ceiling area of which is to be measured in accordance with the invention.

FIG. 5 illustrates various methods according to the invention for measuring each of the polygonal planar surfaces delimiting a room.

The wall 52 is modelled from a complete series of measuring points consisting of the peaks 60, 75, 76, 63 of the wall. Similarly, the under-roof slope 55 is modelled from a complete series of measuring points consisting of the peaks 60, 61, 62, 63 of the slope.

Each of the other surfaces is modelled from a complete series of measuring points consisting of two points targeted on each edge of the surface, some edge points also corresponding to peaks of the surface. The wall 54 is thus modelled from a series of measuring points consisting of the measuring points 65 and 66 on a first wall edge, the measuring points 68 and 69 on a second wall edge, the measuring points 70 and 71 on a third wall edge, and the measuring points 72, 73 on the last edge of the wall. Similarly, the under-roof slope 56 is modelled from the measuring points 62 and 64 taken on a first edge of the slope, the measuring points 61 and 67 taken on a second edge, the measuring points 61 and 62 taken on a third edge of the slope, and the measuring points 65 and 66 taken on the last edge of the slope. The edges of the wall 51 are modelled by straight lines from the pairs of measuring points 74 and 75, 75 and 60, 60 and 61, 61 and 67, 73 and 72. Similarly, the edges of the wall 53 are modelled from the pairs of measuring points 77 and 76, 76 and 63, 63 and 62, 62 and 64, 68 and 69. The edges of the floor 50 are modelled from the pairs of measuring points 74 and 75, 75 and 76, 76 and 77, 70 and 71.

The modelling process for each of the surfaces commences with the input of an order to start the process and finishes with the input of an order to terminate the process.

It may be desired to model all of these surfaces on a single, unique model, known as the consolidated model, three-dimensionally or two-dimensionally encompassing the digital models for each of the surfaces.

Moreover, given the geometry of the site, the surfaces to be measured have common edges. Once a first surface has been modelled and the modelling of a second surface, adjacent to the first, is started, it may therefore be advantageous, for the production of the second digital model, to reuse the modelling of the edge common to the two surfaces, produced in the first model.

For these two reasons, the processing unit according to the invention is advantageously suitable for:
  producing a consolidated model encompassing a plurality of digital models, each corresponding to a polygonal planar surface,
  producing a digital model of a surface from, on the one hand, geometric objects (in the example, a segment and its two peaks) of another existing digital model pertaining to the same consolidated model (thus effectively imposing geometric constraints on the model during elaboration) and, on the other hand, a reduced series of additional measuring, and optionally constraint, points allowing, in combination with the reused geometric objects, complete determination of the surface topology.

Thus, in order to measure the room illustrated in FIG. 5, the device 1 is placed at an arbitrary observation point, for example a central point. An order to start a session for modelling a plurality of polygonal planar surfaces is input prior to a first surface modelling process. As a result, the processing unit is suitable for producing, in a single, unique consolidated model (i.e. in a single file), digital models of various polygonal planar surfaces, provided that no order to terminate the modelling session is input.

The horizontal is initialised as explained above, the processing unit being suitable for preserving the horizontal-identifying data as plotted by this initialisation process, provided that no initialisation order is reinput. This function is advantageous in view of the fact that the device is not moved between the successive processes for modelling the various surfaces of the room.

The wall 52 is, for example, modelled first. In order to do this, an order to start a process for modelling a vertical polygonal planar surface from the peaks thereof is input. The peaks 60, 63, 76 and 75 are plotted and an order to terminate the process is input.

In order then to model the under-roof slope 55, for example, an order to start a process for modelling an arbitrary polygonal planar surface from the peaks thereof is input. The slope model produced following this command is then added to the previously produced model of the wall 52. The segment generated by the measuring points 60 and 63 is selected, as the segment also pertaining to the model of the slope 55 being elaborated, from the digital model of the wall 52. This selection amounts to inputting constraint data imposing two peaks on the slope model. The two missing peaks 61 and 62 of the slope are then plotted and an order to terminate the process of modelling the slope 55 is input.

In order then to model the wall 51, for example, an order to start a process for modelling a vertical polygonal planar surface from the edges thereof is input. The wall model produced following this command supplements the previously produced models of the wall 52 and slope 55. The segment generated by the measuring points 60 and 75 in the digital model of the wall 52 and the segment generated by the measuring points 60 and 61 in the digital model of the slope 55 are selected as segments also pertaining to the model being elaborated. This selection amounts to the input of constraint data imposing two segments on the model of the wall 51. The pairs of measuring points 61 and 67, 73 and 72, 74 and 75 are then plotted and an order to terminate the process of modelling the wall 51 is input.

It should be noted that the processing unit is suitable for producing only two-dimensional digital models; the consolidated model is constructed by adding the model being constructed to the preceding adjacent models, the common segment of which is selected first. Thus, if the segment 60-75 of the model of the wall 52 is selected first, as the segment imposed on the model of the wall 51, the model of the wall 51 is added to the model of the wall 52 with which it shares this segment. The subsequent selection, from the model of the slope 55, of the segment 60-61, as the segment imposed on the model of the wall 51, causes the generation, in the consolidated model, of a new segment representing this segment 60-61 (i.e. the corresponding edge) for the model of the wall 51.

It should also be noted that, in the foregoing method, the measuring points 61 and 75 are plotted twice. This unnecessary repetition may be avoided, for example, by choosing to model the wall 51 from the peaks thereof. Selecting, from the digital model of the wall 52, the segment generated by the measuring points 60 and 75 and, from the digital model of the slope 55, the segment generated by the measuring points 60 and 61, as segments also pertaining to the model of the wall 51 being elaborated, therefore amounts to inputting constraint data generating three peaks in the model of the wall 51. The two missing peaks have then to be plotted in order to terminate the modelling process.

This unnecessary repetition may also be avoided by defining the segment 61-67, from the measuring point 67 and constraints imposing the generation of a segment from this single measuring point, and the junction of the segment generated with the segment 60-61 at the end 61 thereof. However, the corresponding manual operations (input of constraint data, etc.) have been found to take longer than re-plotting the point 61 or any other measuring point (separate from the point 67) on the corresponding edge for generating the corresponding segment.

Generally, it is recommended to use the same method of plotting (by peaks or edges) for each of the surfaces modelled within a single session, in order to automate the plotting processes and thus avoid any risk of error. Modelling of the surface by the peaks thereof is preferred whenever possible (when there are no obstacles), since this limits the number of measuring points to be plotted.

Once all of the surfaces have been modelled, after having input the order to terminate the last modelling process, an order is input to terminate the modelling session.

The processing unit is suitable for calculating the surface area of each of the models produced and thus for estimating the area of each of the polygonal planar surfaces measured. Preferably, it is also suitable for calculating the total surface area of the floor surface models, the wall surface models and the (horizontal and/or inclined) ceiling surface models.

The invention may obviously be varied in numerous ways compared to the embodiments described above and illustrated in the figures.

The invention claimed is:

1. A method for measuring the area of polygonal planar surfaces in space, wherein
   a device (1) is used comprising:
      a range finder (2) mounted on a leg support (4) by means of a frame (15) having a central point (16) and being suitable for allowing a user to orient the range finder toward a material point of a surface, known as the targeted point, of his choice, said range finder being suitable for being able to deliver a signal representing the distance separating the central point from the targeted point,
      means (5, 6) for the angular tracking in space of the direction, known as the viewing direction, passing through the central point and the targeted point, these angular tracking means being suitable for being able to deliver signals representing the orientation of the viewing direction relative to a spatial reference frame centred on the central point,
      the range finder and the angular tracking means thus being suitable for being able to deliver signals representing the spherical coordinates of the targeted point relative to said spatial reference frame,
      means (82) for triggering, at the user's command, the acquisition of the spherical coordinates of the targeted point, which means are capable of triggering the storing of digital data representing the spherical coordinates from the signals delivered by the range finder and the angular tracking means,
      a digital processing unit (9), suitable for being able to model polygonal planar surfaces from the acquired spherical coordinates of targeted points, known as measuring points, which allow said polygonal planar surfaces to be determined topologically, the method being wherein, for each polygonal planar surface to be measured (13; 55):
   a series of measuring points (19-38; 60-63) is selected allowing said polygonal planar surface to be determined topologically and individually, which series comprises, for each edge of the polygonal surface, at most two points, the projections of which on said surface in a predetermined direction pertain to said edge,
   said surface is subjected to a modelling process in which the measuring points of the series are plotted by orienting the range finder successively toward each measuring point and by triggering the acquisition of its spherical coordinates, the processing unit being suitable for being able to:
      produce and store a geometric digital model of the polygonal planar surface by generating a segment or a straight line for each edge of said surface from the acquired spherical coordinates of at most two measuring points,
      calculate and record a value representing the surface area of the digital model thus produced.

2. A method as claimed in claim 1, wherein, for at least one polygonal planar surface to be measured (55), a series of measuring points (60-63), known as a complete series, is selected which determines on its own the topology of said polygonal planar surface.

3. A method as claimed in claim 2, wherein, for at least one polygonal planar surface (55), a series of measuring points (60-63) is selected comprising, for each peak of the polygonal surface, a point, the projection of which on said surface in a predetermined direction coincides with said peak.

4. A method as claimed in claim 3, wherein, for measuring a horizontal polygonal planar surface of a room, such as a horizontal floor or ceiling, a series of measuring points is selected comprising for each peak of the polygonal surface, a point, the vertical projection of which on said horizontal surface coincides with said peak.

5. A method as claimed in claim 2, wherein, for at least one polygonal planar surface (14), a series of measuring points is selected comprising, for each edge (47) of the polygonal surface, two points (45, 46), the projections (48, 49) of which on the surface in a predetermined direction pertain to said edge and are separate.

6. A method as claimed in claim 5, wherein, for measuring a horizontal polygonal planar surface of a room, such as a horizontal floor or ceiling, a series of measuring points is selected comprising, for each edge of the polygonal surface, two points, the vertical projections of which on said horizontal surface pertain to said edge and are separate.

7. A method as claimed in claim 1, wherein, for at least one polygonal planar surface (13) to be measured:
   on the one hand, a series of measuring points (19-38), known as a reduced series, and, on the other hand, a series of geometric constraints to be imposed on a digital model of the polygonal planar surface, including at least one geometric object (29, 32) to be imposed on said digital model and/or at least one geometric relationship to be imposed between geometric objects of said digital model, are selected, said series of measuring points and geometric constraints being selected in such a way that, in combination, they determine the topology of the polygonal planar surface,
   said surface is subjected to a modelling process in which each measuring point (19-38) of the corresponding series is plotted and data, known as constraint data, allowing each geometric constraint of the corresponding series to be defined, are input by means of a graphic user interface (12a, 12b),
   the processing unit being suitable for:
      allowing the user to input such constraint data and to manage said data,
      producing a digital model of the polygonal planar surface by generating segments and/or straight lines from the acquired spherical coordinates of the reduced series of measuring points and from the input constraint data of the series of constraints.

8. A method as claimed in claim 7, wherein a reduced series of measuring points (19-38) is selected comprising, for a plurality of the peaks of the polygonal surface, a point, the projection of which on said surface in a predetermined direction coincides with said peak.

9. A method as claimed in claim 7, wherein a reduced series of measuring points is selected comprising, for a plurality of the edges of the polygonal surface, two points, the projections of which on said surface in a predetermined direction pertain to said edge and are separate.

10. A method as claimed in claim 7, wherein at least one item of constraint data is input generating a geometric object selected from a point, a segment and a polygon.

11. A method as claimed in claim 7, wherein at least one item of constraint data is input generating a geometric relationship selected from an angle between two segments of the digital model, an orientation of a segment, a length of a segment, a junction between two segments and a parallel arrangement of two segments.

12. A method as claimed in claim 7, wherein at least one item of constraint data is input generating a curved geometric object, such as an arc, the processing unit (9) being suitable for producing, from such constraint data, a non-polygonal planar digital model integrating a/some curved geometric object/s and for calculating a value representing the surface area of the digital model thus produced.

13. A method as claimed in claim 1, wherein the range finder (2) is manually oriented toward each measuring point.

14. A method as claimed in claim 1, wherein the acquisition of the spherical coordinates of each measuring point is manually triggered at the viewing moment of said measuring point.

15. A method as claimed in claim 1, wherein the process of modelling a polygonal planar surface (13) includes the following steps:
- measuring points (20-24, 34, 35, 37, 38) of the corresponding series, which are visible from a first observation point (A), are plotted,
- the central point of the device is moved to a second observation point (B) from which at least one other measuring point of said series, which is not visible from the first observation point, is visible,
- points (90, 91), known as resetting points, are plotted from the second observation point, said resetting points being selected so as to allow the position of the second observation point to be determined relative to the first observation point,
- the measuring point(s) (25-28, 19, 30, 31, 33, 34, 36, 37) which is/are visible from the second observation point is/are plotted, the processing unit being suitable for calculating the coordinates, in the spatial reference frame of the first observation point, of the second observation point and of the measuring point(s) plotted therefrom.

16. A method as claimed in claim 1, wherein the process of modelling each polygonal planar surface includes an initial input of an order to start said process and a final input of an order to terminate said process, with the aid of a user interface of the device.

17. A method as claimed in claim 1, wherein a type of series of measuring points is selected and an item of data defining the selected series type is input at the start of the modelling process.

18. A method as claimed in claim 1 for measuring a plurality of polygonal planar surfaces (50-56) of which it is desired to produce a digital model, known as a consolidated model, encompassing the digital models of said surfaces, wherein an order to start a modelling session is input prior to a first surface modelling process and an order to terminate said session is input after the end of a final surface modelling process.

19. A device for measuring the area of polygonal planar surfaces in space, comprising:
- a range finder (2) mounted on a leg support (4) by means of a frame (15) having a central point (16) and being suitable for allowing a user to orient the range finder toward a material point of a surface, known as the targeted point, of his choice, said range finder being suitable for being able to deliver a signal representing the distance separating the central point from the targeted point,
- means (5, 6) for the angular tracking in space of the direction, known as the viewing direction, passing through the central point and the targeted point, these angular tracking means being suitable for being able to deliver signals representing the orientation of the viewing direction relative to a spatial reference frame centred on the central point,
- the range finder and the angular tracking means thus being suitable for being able to deliver signals representing the spherical coordinates of the targeted point relative to said spatial reference frame,
- means (82) for triggering, at the user's command, the acquisition of the spherical coordinates of the targeted point, which means are capable of triggering the storing of digital data representing these spherical coordinates from the signals delivered by the range finder (2) and the angular tracking means (5, 6),
- a digital processing unit (9), suitable for being able to model polygonal planar surfaces from the acquired spherical coordinates of targeted points, known as measuring points, which allow said polygonal planar surfaces to be determined topologically, wherein the processing unit is suitable for being able to:
- produce and store a geometric digital model of each polygonal planar surface (13; 55) from a series of measuring points (19-38; 60-63) which allows said surface to be determined topologically and individually and comprises, for each edge of the polygonal planar surface, at most two points, the projections of which on said surface in a predetermined direction pertain to said edge, by generating a segment or a straight line for each edge of said surface from the acquired spherical coordinates of at most two measuring points of the series,
- calculate and record a value representing the surface area of each digital model thus produced.

20. A device as claimed in claim 19, wherein the processing unit (9) is suitable for producing a digital model of a polygonal planar surface (55) from the acquired spherical coordinates of a series of measuring points (60-63), known as a complete series, which determines on its own the topology of the polygonal planar surface.

21. A device as claimed in claim 20, wherein the processing unit (9) is suitable for producing a digital model of a polygonal planar surface (55) from a series of measuring points comprising, for each peak of the polygonal surface, a point (60-63), the projection of which on the surface in a predetermined direction coincides with said peak.

22. A device as claimed in claim 21, intended to be used for measuring the area of surfaces delimiting a room, wherein the processing unit (9) is suitable for producing a digital model of a horizontal polygonal planar surface, such as a horizontal floor or ceiling, from a series of measuring points comprising, for each peak of the polygonal surface, a point, the vertical projection of which on said horizontal surface coincides with said peak.

23. A device as claimed in claim 20, wherein the processing unit (9) is suitable for producing a digital model of a polygonal planar surface (14; 54) from a series of measuring points comprising, for each edge of the polygonal surface, two points (45, 46 . . . ; 65, 66, 68-73), the projections of which on the surface in a predetermined direction pertain to said edge and are separate.

24. A device as claimed in claim 23, intended to be used for measuring the area of surfaces delimiting a room, wherein the processing unit (9) is suitable for producing a digital model of a horizontal polygonal planar surface (14), such as a horizontal floor or ceiling, from a series of measuring points comprising, for each edge (47) of the polygonal surface, two points (45, 46), the vertical projections (48, 49) of which on said horizontal surface pertain to said edge and are separate.

25. A device as claimed in claim 19, wherein the processing unit (9) is suitable for:
- allowing the user, by means of a graphic user interface (12*a*, 12*b*), to input data, known as constraint data, allowing definition of geometric constraints to be imposed on a digital model, including data allowing generation of geometric objects in the digital model and data allowing generation of geometric relationships between geometric objects of the digital model,
- managing input constraint data so as to allow the production of a digital model of a polygonal planar surface (13) by generating segments and/or straight lines from the acquired spherical coordinates of a series of measuring points (19-38), known as a reduced series, and from the input constraint data of a series of geometric constraints, said series of measuring points and constraints allowing, in combination, the topology of the polygonal planar surface to be determined.

26. A device as claimed in claim 25, wherein the processing unit (9) is suitable for allowing the user to input constraint data generating geometric objects selected from a point, a segment and a polygon.

27. A device as claimed in claim 25, wherein the processing unit (9) is suitable for allowing the user to input constraint data generating geometric relationships selected from an angle between two segments of the digital model, an orientation of a segment, a length of a segment, a junction between two segments and a parallel arrangement of two segments.

28. A device as claimed in claim 25, wherein the processing unit (9) is suitable for:
- allowing the user to input constraint data generating curved geometric objects, such as an arc,
- producing, from such constraint data, a non-polygonal planar digital model integrating a/some curved geometric object/s,
- calculating a value representing the surface area of the digital model thus produced.

29. A device as claimed in claim 25, wherein the processing unit (9) is suitable for managing non-oriented constraints, using a variational approach.

30. A device as claimed in claim 19, wherein the processing unit (9) is suitable for producing two-dimensional geometric digital models.

31. A device as claimed in claim 19, wherein the processing unit (9) is suitable for producing three-dimensional geometric digital models.

32. A device as claimed in claim 19, wherein the processing unit (9) is suitable for producing a model, known as a consolidated model, encompassing a plurality of digital models, each corresponding to a polygonal planar surface.

33. A device as claimed in claim 19, wherein the processing unit (9) is suitable for calculating and recording a value representing the length of each segment of a digital model produced and a value representing the length of the perimeter of the digital model.

34. A device as claimed in claim 19, wherein the frame (15) comprises means (7, 8) for maneuvering the range finder, which means are suitable for allowing said range finder to be manually oriented by the user.

35. A device as claimed in claim 19, wherein the triggering means comprise a manual triggering member (82) having immediate effect.

36. A device as claimed in claim 19, wherein the angular tracking means comprise two angle encoders (5, 6).

* * * * *